May 29, 1923.
A. G. HALE
1,456,797
VACUUM BOTTLE
Filed June 20, 1921
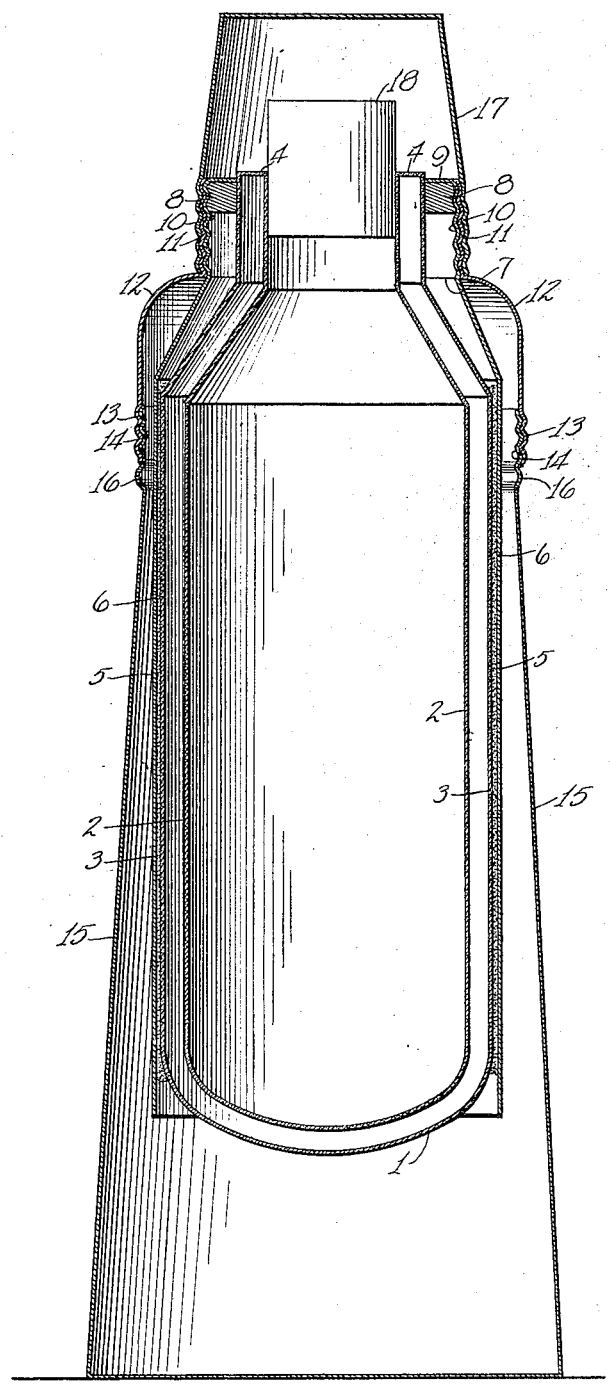
INVENTOR
A. G. Hale
BY
ATTORNEYS Patented May 29, 1923.

1,456,797

UNITED STATES PATENT OFFICE.

ALBERT GIBSON HALE, OF FORT THOMAS, KENTUCKY.

VACUUM BOTTLE.

Application filed June 20, 1921. Serial No. 478,876.

*To all whom it may concern:*

Be it known that I, ALBERT GIBSON HALE, a citizen of the United States, and a resident of Fort Thomas, in the county of Campbell and State of Kentucky, have invented a new and useful Improvement in Vacuum Bottles, of which the following is a full, clear, and exact description.

My invention relates to vacuum bottles, and it consists in the combinations, constructions and arrangements herein described and claimed.

An object of my invention is to provide a vacuum bottle having means for holding a receptacle in position to permit a liquid to be poured therefrom and for absorbing shocks and jars incident to the service for which intended without transmitting such shocks and jars to the receptacle.

A further object of my invention is to provide a vacuum bottle having a frangible receptacle and a casing encompassing the receptacle and spaced therefrom, whereby the frangible receptacle is not likely to be broken in service.

A further object of my invention is to provide a device of the character described that is relatively simple in construction, and capable of being manufactured cheaply.

Other objects and advantages will appear in the following specification, and the novel features of the invention will be particularly pointed out in the appended claim.

My invention is illustrated in the accompanying drawing, forming part of this application, in which The figure is a vertical section through the device.

In carrying out my invention, I make use of a frangible receptacle indicated generally at 1 and formed with the usual inner shell 2 and an outer shell or vacuum jacket 3. The shells 2 and 3 are made of glass and may be formed integrally with one another or separately and joined together at the mouth, as at 4. The bottle 1 is disposed within a casing 5 that fits the outer shell 3 closely for the greater part of its length and is rigidly secured to the latter in any suitable manner, as by introducing a cementing substance 6 between the adjacent walls of the casing 5 and of the shell 3. The casing 5 is open at each end and is reduced at 7 to conform in configuration with the outer shell 3 of the bottle. The reduced portion 7 has a diameter greater than the outer diameter of the corresponding portion of neck of the bottle and is spaced from the latter by a resilient ring 8. The resilient ring 8 is slightly compressed and forced between the inner wall of the reduced portion 7 and the outer wall of the neck of the bottle. The reduced portion 7 is then crimped at its end, as at 9, to overlie the end of the resilient ring 8 and to thereby prevent displacement of the latter.

The reduced portion 7 is threaded exteriorly, as at 10, to engage the interiorly threaded reduced portion 11 of a union or coupling 12. The latter is threaded interiorly adjacent to its other end, as at 13, for engagement with the exteriorly threaded end portion 14 of an outer casing 15. The latter is formed to provide an annular stop shoulder 16 that limits the movement of the union 12 on the casing 15. The casing 15 is made of metal or other material having sufficient inherent strength to resist the stresses to which subjected in service without distortion and has a greater diameter at its upper open end than the outer diameter of the casing 5. As stated, the reduced portion 11 of the union 12 is adapted to engage the reduced portion of the casing 5, but the remainder of the union 12 has a diameter greater than the outer diameter of the corresponding portion of the casing 5 and is therefore spaced from the latter. A cap 17 is threaded on the reduced portion 11 and the usual stopper 18 is provided for closing the mouth of the bottle.

From the foregoing description of the various parts of the device, the operation thereof may be readily understood. In the embodiment of the invention illustrated, the casing 15 has a greater diameter at its lower end, which is closed, than at its upper open end and consequently the device is not easily overturned but will remain in upright position. In service, the bottle is frequently dropped or receives shocks or jars on account of various causes. In similar devices of which I am aware, the outer casing is not spaced from the inner casing in the manner which I have described and therefore the bottle proper or receptacle, which is made of frangible material, may be broken when a comparatively severe shock is received. When my device is employed, any shock or jar received by the outer casing 15 will be distributed uniformly over the entire area of the outer casing and then absorbed by the resilient ring 8 without being transmitted to the frangible receptacle or bottle proper 1. My device will therefore last longer under service conditions than will a bottle of ordinary construction. In addition, since the receptacle 1 is spaced from the outer casing 15, it is more effectively insulated on account of the provision of the encompassing air space and is not so likely to be affected by changes of temperature as is a device of ordinary construction in which the outer casing fits the receptacle closely.

Obviously, modifications and adaptations of the form of the device illustrated in the accompanying drawing may be provided without departing from the spirit and scope of my invention and I therefore consider as my own all such modifications and adaptations thereof as do not depart from the spirit and scope of the invention as outlined in the foregoing and particularly in the appended claim.

I claim:

A device of the type described comprising a frangible container having a reduced neck, an inner metal casing cemented to said container, the neck of said casing being spaced from the neck of said container, a resilient washer disposed between the neck of said container and the neck of said casing, the neck of said casing being threaded, a coupling having a threaded portion adapted to be screwed onto the casing, said coupling being spaced from said casing at all other points, an outer casing secured to said coupling and being spaced from said inner casing at all points, and a cap screwed onto said coupling and being adapted to enclose the open end of said container.

ALBERT GIBSON HALE.